Jan. 22, 1952 — H. C. WATERMAN ET AL — 2,583,032

SELECTIVE CALLING SYSTEM

Filed Sept. 25, 1948 — 8 Sheets-Sheet 1

INVENTORS.
Herbert C. Waterman
Marion R. Winkler
BY
Gorman L. Mueller
Atty.

SELECTIVE CALLING SYSTEM

Filed Sept. 25, 1948 8 Sheets-Sheet 2

INVENTORS.
Herbert C. Waterman
Marion R. Winkler
BY
Freeman L. Mueller
Atty.

Jan. 22, 1952 H. C. WATERMAN ET AL 2,583,032

SELECTIVE CALLING SYSTEM

Filed Sept. 25, 1948 8 Sheets-Sheet 3

INVENTORS.
Herbert C. Waterman
Marion R. Winkler
BY
Norman L. Mueller
Atty.

Jan. 22, 1952 H. C. WATERMAN ET AL 2,583,032

SELECTIVE CALLING SYSTEM

Filed Sept. 25, 1948 8 Sheets-Sheet 4

INVENTORS
Herbert C. Waterman
Marion R. Winkler
BY
Foorman L. Mueller
Atty.

Jan. 22, 1952 H. C. WATERMAN ET AL 2,583,032

SELECTIVE CALLING SYSTEM

Filed Sept. 25, 1948 8 Sheets-Sheet 5

INVENTORS.
Herbert C. Waterman
Marion R. Winkler
BY
Looman L. Mueller
Atty.

Jan. 22, 1952 H. C. WATERMAN ET AL 2,583,032

SELECTIVE CALLING SYSTEM

Filed Sept. 25, 1948 8 Sheets-Sheet 6

INVENTORS.
Herbert C. Waterman
Marion R. Winkler
BY
Foorman L. Mueller
Atty.

Jan. 22, 1952 H. C. WATERMAN ET AL 2,583,032

SELECTIVE CALLING SYSTEM

Filed Sept. 25, 1948 8 Sheets-Sheet 7

INVENTORS.
Herbert C. Waterman
Marion R. Winkler
BY
Foorman L. Mueller
Atty.

Jan. 22, 1952 H. C. WATERMAN ET AL 2,583,032

SELECTIVE CALLING SYSTEM

Filed Sept. 25, 1948 8 Sheets-Sheet 8

INVENTORS
Herbert C. Waterman
Marion R. Winkler
BY
Foorman L. Mueller
Atty.

Patented Jan. 22, 1952 2,583,032

UNITED STATES PATENT OFFICE 2,583,032

SELECTIVE CALLING SYSTEM

Herbert C. Waterman, Chicago, and Marion R. Winkler, La Grange Park, Ill., assignors to Motorola, Inc., Chicago, Ill., a corporation of Illinois Application September 25, 1948, Serial No. 51,248

24 Claims. (Cl. 179—1)

This invention relates generally to remote control equipment and more particularly to a selective control system for use with communication equipment in which audio frequency control signals are transmitted over the voice communication channel.

In the prior art various remote control and selective switching equipment has been developed to provide fast remote control of communication equipment. The selective switching arrangements used in standard telephone systems is an example of such equipment. There is a need for remote control systems which may provide selective switching and other remote control by the use of signals transmtited over the regular communication channel so that additional channels are not required for the controlling signals. For example, it may be desired to control a remote transmitter so that it can be turned on or off and the frequency thereof selected from a central station. It may also be desired to transmit signals from the transmitter for selectively calling remote stations, such as mobile stations, with which it is desired to communicate. To provide such signalling over the regular communication channel would of course result in a great saving over the use of an auxiliary wire line or radio system for transmission of the control signals.

It is desired that such remote control systems be small and rugged so that they can be used in mobile installations where space is at a premium and reliable operation is required under relatively adverse conditions. That is, the equipment must not be extremely sensitive to shock or vibration caused by the vehicle or to temperature changes, since the equipment would be subjected to relatively wide temperature variations.

To provide such a remote control system, vibrating reed controlled tone generators and responsive devices have been produced which are compact and rugged and which provide very good frequency stability over the required operating conditions. In order to provide complicated control operations by the use of the reed generators and responders, switching arrangements are required so that the tones required to operate a particular responder can be combined and transmitted in the proper sequence. The responder will react to one particular combination of frequencies to provide the desired control. Such control systems must be flexible so that they may be used in systems having a large number of stations and where a large number of different switching operations are required. There is also a need for such equipment in simple systems wherein a relatively few control operations are required. In any instance, the operation of the controls must be simple to eliminate the need for skilled operators and must be dependable to avoid improper operation thereof insofar as is possible.

It is therefore an object of this invention to provide an improved control system for use with radio communication equipment.

A further object of this invention is to provide a system for selectively combining audio tones in pairs and applying the tones over a voice channel in a predetermined sequence.

A further object of this invention is to provide a control signal for use in a communication system for selectively calling a station in the system and/or providing some other control function at a remote station.

A feature of this invention is the provision of a key operated switching system for combining certain pairs of a plurality of tones and transmitting the same in a predetermined sequence.

A further feature of this invention is the provision of a key operated control box for selecting predetermined tones and a timer system for applying the tones in a predetermined manner to a communication channel.

A still further feature of this invention is the provision of a control system in which operation of one switch will provide tones for energizing a communication system, operation of additional switches will provide selective signals for calling a particular station and release of the first switch will provide an additional signal to disable the communication system.

Further objects, features and advantages will be apparent from a consideration of the following description when taken in connection with the accompanying drawings in which.

In practicing the invention there is provided a control system for selectively applying pairs of audio tones in sequence to a communication channel for controlling equipment at remote stations. The system includes a tone generator chassis having a plurality of oscillators adapted to produce different tones of audio frequency. A second chassis includes timing circuits and a power supply for the entire control apparatus. The circuits are arranged to apply various tones of a composite signal in a predetermined sequence. The control boxes include switching means for selectively connecting the desired oscillators to the timing circuits so that the signal transmitted includes the desired frequencies. The control boxes include facilities for transmitting tones required for various remote operations such as turning on and off a remote transmitter, or selecting certain receivers, etc. The system is also adapted to transmit signals on the communication channel which may be radiated by the transmitter and applied to condition a particular receiver or group of receivers for operation so that communications following will be received by these receivers only. When a large number of control and/or selective calling operations are required a tone generator chassis having a large number of oscillators operating at different frequencies may be provided together with a control box which is adapted to select a large number of frequencies for the various calls. On the other hand, the equipment is suitable for use in a simple system and may then be provided with a relatively few different tone frequencies and simple control boxes for combining the tones.

Figure 1:
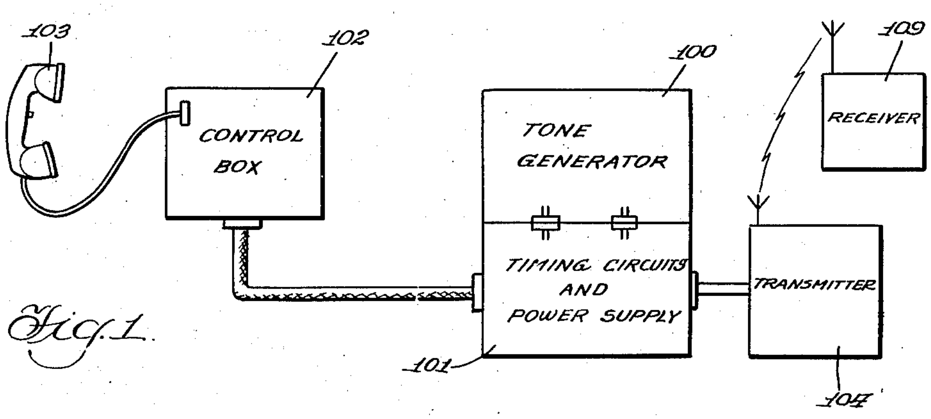
Fig. 1 illustrates the control system in accordance with the invention schematically by block diagrams.

Fig. 1 illustrates the remote control system in accordance with the invention as composed of three main units, the tone generator 100, the timing circuits and power supply 101 and the control box 102. A standard telephone type handset 103 is shown plugged into the control box. The timing circuit may be connected to a transmitter 104 located remotely therefrom which communicates with one or more receivers 109. The operator at the control box can control the operation of the transmitter and/or receivers and also communicate with the operators thereat.

Figure 2:
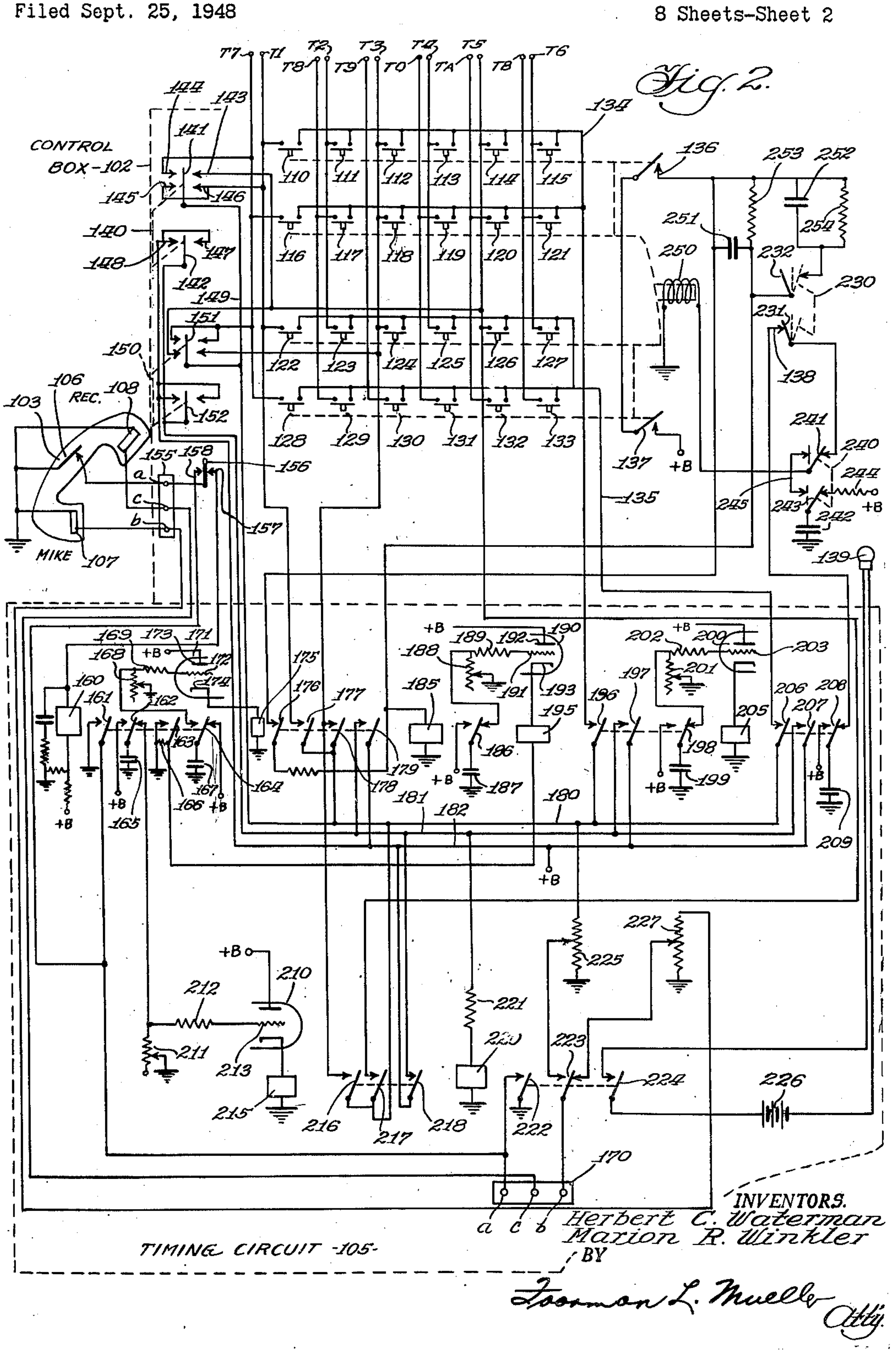
Fig. 2 is a simplified circuit diagram of the control system according to the invention.

Fig. 2 is a circuit diagram illustrating the control system in accordance with the invention. The tone generator is not shown in Fig. 2 but twelve tones of different audio frequencies provided thereby will be applied to the terminals marked T1 to T9 inclusive, T0, TA and TB. Connections are made from the terminals to one contact of each of the switches which are indicated as 110 to 133 inclusive. The tone T1 is applied to one contact of switches 110 and 122, and tone T2 is applied to switches 111 and 123. It will be seen that there is in effect two banks of switches, one including switches 110 to 121 inclusive, and the other including the switches 122 to 133 inclusive. Each tone is applied to one of the contacts of a switch in each bank. The second contacts of the switches in each bank are connected together and to the common leads 134 and 135 which are adapted to supply tones to the timing circuit as will be further explained. By selectively operating the push buttons 110 to 133, the tones applied to the leads 134 and 135 can be determined.

A plurality of auxilary switches are included in the control box 102 including the switches 140 and 150. Switch 140 includes movable contacts 141 and 142, with the movable contact 141 being arranged to cooperate with fixed contacts 143 to 146 inclusive, and the movable contact 142 being arranged to cooperate with fixed contacts 147 and 148. It is noted that contact 143 is connected to tone T5, contact 144 to tone T7, and contacts 145 and 146 to tone T1. Therefore when the switch contact 141 is moved to the right, tones T1 and T5 will be applied thereto and when the switch contact 141 is moved to the left tones T1 and T7 will be applied thereto. The contact 142 is for providing operation of an auxiliary circuit of the timing circuit as will be described more in detail. Switch 150 may be identical to switch 140 and is connected so that different pairs of tones are applied to the movable contact 151 thereof. It will be apparent that when the contact 151 is moved to the right, tones T7 and T3 will be applied and when the contact is moved to the left, tones T5 and T7. The movable contact 152 provides a control connection in the same manner as contact 142.

The handset 103 is removably connected to a terminal board 155 including a terminal *a* connected to the push-to-talk switch 106, terminal *b* connected to microphone 107, and a terminal *c* connected to the receiver 108. The push-to-talk connection in the control box is made to the movable contact 156 of the transmit-interphone switch. When connection is made to contact 157, transmitter operation is provided and when connection is made to contact 158 interphone operation is provided as will be more fully described.

Referring now to the timing circuit 105 which is a part of the timing circuit and power supply designated as 101, it will be apparent that various connections are made between the control box and the timing circuit. When the contact 156 is in the transmit position (engaging contact 157), and the push-to-talk switch 106 is closed, the relay 160 will be connected between plus B and ground so that the relay will be actuated. This will cause the various contacts 161, 162, 163 and 164 of the relay to move to the left. The contact 161 is adapted to ground the terminal *a* on the terminal board 170 which is connected to the equipment to be controlled. This may produce some control function such as the turning on of an amplifier at the transmitter. It will be apparent that this same result is produced by closing of the push-to-talk switch 106 when the transmit-interphone switch is in the interphone position and contacts 156 and 158 are engaged, that is, in either case, the terminal *a* of terminal board 170 is grounded.

The contact 162 causes the condenser 165 to be connected to plus B so that the condenser will be charged thereby, and contact 163 is effective to short out resistor 166. Contact 164 is effective to connect condenser 167 to the triode section 171, the condenser being charged from plus B before the relay was actuated. The voltage across condenser 167 is applied across variable resistor 168 and through resistor 169 to the grid 172 of the triode. The anode 173 is connected to plus B and the cathode 174 is connected through relay 175 to ground. When the condenser 167 is charged, the voltage therefrom applied to the triode 171 causes the triode to conduct so that the relay 175 will be actuated.

The relay 175 includes contacts 176, 177, 178 and 179. Contacts 177 and 178 are arranged to make connection with tones T1 and T3 and to apply the same to the main tone conductor 180. Contact 179 is arranged to short conductors 181 and 182 which are included in an auxiliary control circuit. Contact 176 closes a circuit through the relay 185 and through the switches 136 and 137 in the control box. As will be more fully explained, the switch 136 represents contacts which are closed when any two of the push-buttons 110 to 121 inclusive are actuated. Contact 137 similarly represents contacts which are closed when any two of the push-buttons 122 to 133 inclusive are operated. It is apparent that when switches 136 and 137 are closed and the relay 175 is operated, the relay 185 is connected to plus B so that this relay will be operated. The relay 185 includes a single movable contact 186 which, when the relay is actuated, connects the condenser 187 to plus B.

It will be apparent that after a time interval the charge on condenser 167 will leak off through resistor 168 so that the triode 171 will cease to conduct. This will permit the relay 175 to drop out so that the contact 176 will open. This will of course release relay 185 so that the contact 186 will move to the right, applying the voltage of condenser 186 to the triode section 190. The condenser is connected across variable resistor 188 and through resistor 189 to the grid 191 of the triode. The anode 192 is connected to plus B and the cathode 193 is connected through relay 195 and switch 163 to ground. The switch 163 will remain closed as long as the push-to-talk switch is closed energizing relay 160.

The relay 195 includes contacts 196, 197 and 198, which are moved to the left when the relay is actuated. The contact 196 connects the conductor 134 to the main tone conductor 180 and the contact 197 shorts the conductors 181 and 182 of the auxiliary control system. The contact 198 connects condenser 199 to plus B so that this condenser will be charged therefrom. As in the previous stage, the condenser 187 will discharge through resistor 188 after a time so that the triode 190 will cease to conduct and the relay 195 will drop out. This will cause contact 198 to move to the right to connect the condenser 199 to the triode 200. The voltage across the condenser 199 is applied across variable resistor 201 and through resistor 202 to the grid 203 of the triode. The anode is connected to plus B and the cathode is connected through relay 205 to ground.

Actuation of relay 205 causes the contacts 206, 207 and 208 thereof to be moved to the left. The contact 206 connects the conductor 135 in the control box to the main tone conductor 180. Contact 207 shorts the conductors 181 and 182 of the auxiliary control circuit and contact 208 connects the condenser 209 to plus B. After the condenser 199 has become discharged through resistor 201, the triode 200 will cease to conduct and relay 205 will drop out causing contact 208 to move to the right. This applies the voltage on condenser 209 to terminal 138 in the control box. This voltage is used to automatically clear the push-button switch after the tones have been transmitted as will be more fully explained.

When the push-to-talk switch 106 is released and the relay 160 is thereby de-energized, the movable contact 162 will move to the right so that the voltage across the condenser 165 is applied to the triode 210. This voltage is applied across variable resistor 211 through resistor 212 to the grid 213 of the triode. The anode of the triode is connected to plus B and the cathode is connected through relay 215 to ground. The voltage of condenser 165 causes the triode 210 to conduct actuating the relay 215 and closing the contacts 216, 217 and 218. The contacts 216 and 217 are arranged to apply the tones T3 and T5 to the main tone conductor 118 and the contact 218 bridges the auxiliary conductors 181 and 182. The relay 215 will remain operated until the condenser 165 becomes discharged after which the relay 215 will drop out.

An auxiliary control circuit is provided for applying either the signal tones or the voice signal from the microphone to terminal *b* of the output terminal board 170. This circuit includes relay 220 which is energized when the conductors 181 and 182 are shorted. The conductor 181 is connected through resistor 221 to the relay and conductor 182 is connected to plus B so that the plus B potential is applied through resistor 221 to the relay when the conductors 181 and 182 are shorted. The relay includes contacts 222, 223 and 224 which are moved to the left when the relay is actuated. The contact 222 is in parallel with the contact 161 so that the terminal *a* of terminal board 170 remains grounded as long as the relay 220 is actuated. The contact 223 makes connection between the main tone conductor 180 and the terminal *b* of terminal board 170 through the variable resistor 225. Terminal *b* is used to apply the tones to the remote equipment. Contact 224 completes a circuit through the tone light 139 on the control box and a source of voltage indicated as a battery 226. This will indicate at the control box when the auxiliary relay 220 is closed.

It will be noted that when the auxiliary relay 220 is not actuated, the contact 223 connects the terminal *b* of terminal board 170 to variable resistor 227. This resistor is connected to the terminal *b* of terminal board 155 so that the signals from the microphone 107 are applied across resistor 227 and through the contact 223 to the terminal *b* of terminal board 170. When the relay 220 is actuated, tones from resistor 225 are applied to the terminal *b*. Terminals *c* of terminal boards 155 and 170 are directly interconnected so that the receiver connection is completed and may be extended to the remote equipment.

Considering now the operation of the system in Fig. 2, it will be shown that the system can be used to send a combination of tones to a remote equipment as for turning on the transmitter at a remote station, applying two sets of tone combinations in sequence which may be transmitted by the remote transmitter for conditioning a remote receiver, and then communicating with the remote station by use of handset 103. After the communication is finished, another combination of tones are applied for turning off the remote transmitter. The tones used for turning on and off the remote transmitter are provided by the fixed wiring in the timing circuit and as illustrated, the transmitter is turned on by tones T1 and T3, and turned off by tones T3 and T5. The tones for conditioning the remote receiver are set up by the push-button switches 110 to 133 inclusive. Although tone combinations including two different tones have been described, it is obvious that single tones can be used or combinations including more than two tones. Greater selectivity and noise protection are obtained by using a larger number of tones but this may not be necessary in certain applications and a simplified system may be entirely satisfactory.

Let us assume that switches 112 and 120 of the first bank are actuated and switches 123 and 127 of the second bank are actuated. As previously stated the switch 136 will be closed when two switches of the first bank are actuated and 137 is closed when two switches of the second bank are actuated. If the transmit-interphone switch 156 is in the transmit position so that contacts 156 and 157 are closed, the operator can by closing the push-to-talk switch 106 communicate directly with the receiver which is operated by the tones corresponding to the tones of the push-buttons selected. In this process the relay 160 will be closed connecting the terminal *a* of terminal board 170 to ground. This provides a control at the remote transmitter so that signals from terminal *b* of terminal board 170 are applied thereto. For example, the control may energize a line amplifier for amplifying signals applied to terminal *b*. The relay 160 also causes the tube 171 to conduct so that relay 175 is immediately energized and the tones T1 and T3 are applied to the main tone conductor 180 and to the resistor 225. The contacts 179 of the relay 175 energize the auxiliary circuit so that the tone from the resistor 225 is applied to the terminal *b*.

The relay 175 also energizes relay 185 since the switches 136 and 137 are closed. When the relays 175 and 185 drop out triode 190 is rendered conducting and the relay 195 is energized. This causes the tones T3 and TA corresponding to the switches 112 and 120 to be applied through conductor 134 to the main tone conductor 180 and through resistor 225 to the terminal *b*. As the transmitter has been turned on the tones will be transmitted and may be used to provide some control operation at a remote receiver. After the relay 195 drops out the relay 205 will be energized and will be effective to apply the tones T2 and T6 corresponding to switches 123 and 127 through conductor 135 to the main tone conductor 180 and through resistor 225 and contact 223 to the terminal *b* of terminal board 170. This may provide the additional tones required for conditioning the remote receiver for operation so that the receiver is now turned on.

During all this time since the push-button has been depressed, the relay 220 has been actuated and the tone light 139 is illuminated. When the switching operation is completed the relay 220 will be deenergized and the tone light will be extinguished so that the operator will know that the switching is completed and he can talk to the operator at the remote receiver. The communication signals are applied to resistor 227, and as relay 220 is now deenergized, the signals are applied through contact 223 to the terminal *b* of terminal board 170. When the communication is finished the operator releases his push-to-talk button releasing relay 160 which causes relay 215 to be energized. The tones T3 and T5 are then applied to the terminal *b* of terminal board 170 for turning off the transmitter.

In the event that the push-to-talk switch is operated before two push-buttons are actuated in each bank, the switches 136 and 137 will not be closed and operation of relay 185 will not take place in response to operation of the relay 175.

However, if the push-buttons are operated after the relay 175 has dropped out, the circuit through the switches 136 and 137 and condenser 251 will provide a current of short duration through relay 185. This will cause relay 185 to be actuated long enough to operate relay 195 and then relay 205 will be operated to send out the tones in sequence as above described.

Switches are provided on the control box 102 for clearing the push-buttons or repeating the call, as may be desired. The switch 230 has three positions, a neutral position as shown, in which the push-buttons remain in their depressed position so that the same station may be called again without resetting the buttons, a position in which the movable contacts are at the left in which the buttons are cleared after each call, and a position in which the contacts are at the right in which the call may be repeated. The switch 240 has just two positions, the position at the right, as shown, in which automatic clearing of the buttons may be provided, and the position in which the contacts are at the left in which the buttons may be cleared by the operator. The switches will normally be positioned as illustrated and when the relay 205 drops out after the second pair of calling signals have been applied to the remote receiver, the condenser 209 will provide a voltage through conductor 138 which is applied through contacts 231 and 241 to the solenoid 250. The solenoid 250 works through a mechanical linkage to clear all the push-buttons. This will automatically open switches 136 and 137.

It is obvious that when the switch 240 is moved to the left the condenser 242, which is normally connected to plus B through movable contact 243 and resistor 244, is connected through the bridging conductor 245 to the movable contact 241 and the voltage across the condenser 242 is applied to solenoid 250 for operating the same. This permits clearing the push-buttons by the operator as desired. When the switch 230 is in the neutral position, both contacts 231 and 232 thereof are open so that no connection is made thereby. This allows the push-buttons to remain actuated so that the same call can be repeated. When the switch 230 is moved to the right, a circuit is completed through the contact 232 and through condenser 252. Condensers 251 and 252 are respectively bridged by resistors 253 and 254 to assure their discharge when not in use. With the closing of switch 230, the condenser 252 will be very quickly charged, part of its charging current tending to discharge condenser 251, the remainder flowing through relay coil 185 in an amount sufficient to cause its momentary operation. This will cause subsequent operation of the relays 195 and 205 in sequence so that the tones from conductors 134 and 135 are again applied to the main tone conductor 180 and to the remote equipment.

The switches 140 and 150 of the control box are arranged to provide any desired auxiliary switching operations such as changing the frequency of a remote transmitter or selectively connecting receivers at the remote station. For example, the switch 140 when moved to the right applies tones T1 and T5 through conductor 149 to the main tone conductor 180. The contact 142 bridges the conductors 181 and 182 of the auxiliary circuit so that the tones are applied to terminal *b* of terminal board 170 and from thence to the remote transmitter. These tones may control selective switches so that the transmitter will operate on a first frequency. Then when the switch 140 is moved to the left, the tones T1 and T7 are applied and this may cause operation of the transmitter on a second frequency. Similarly, switch 150 may be used to connect either a first or a second receiver for operation as desired.

Figure 3:
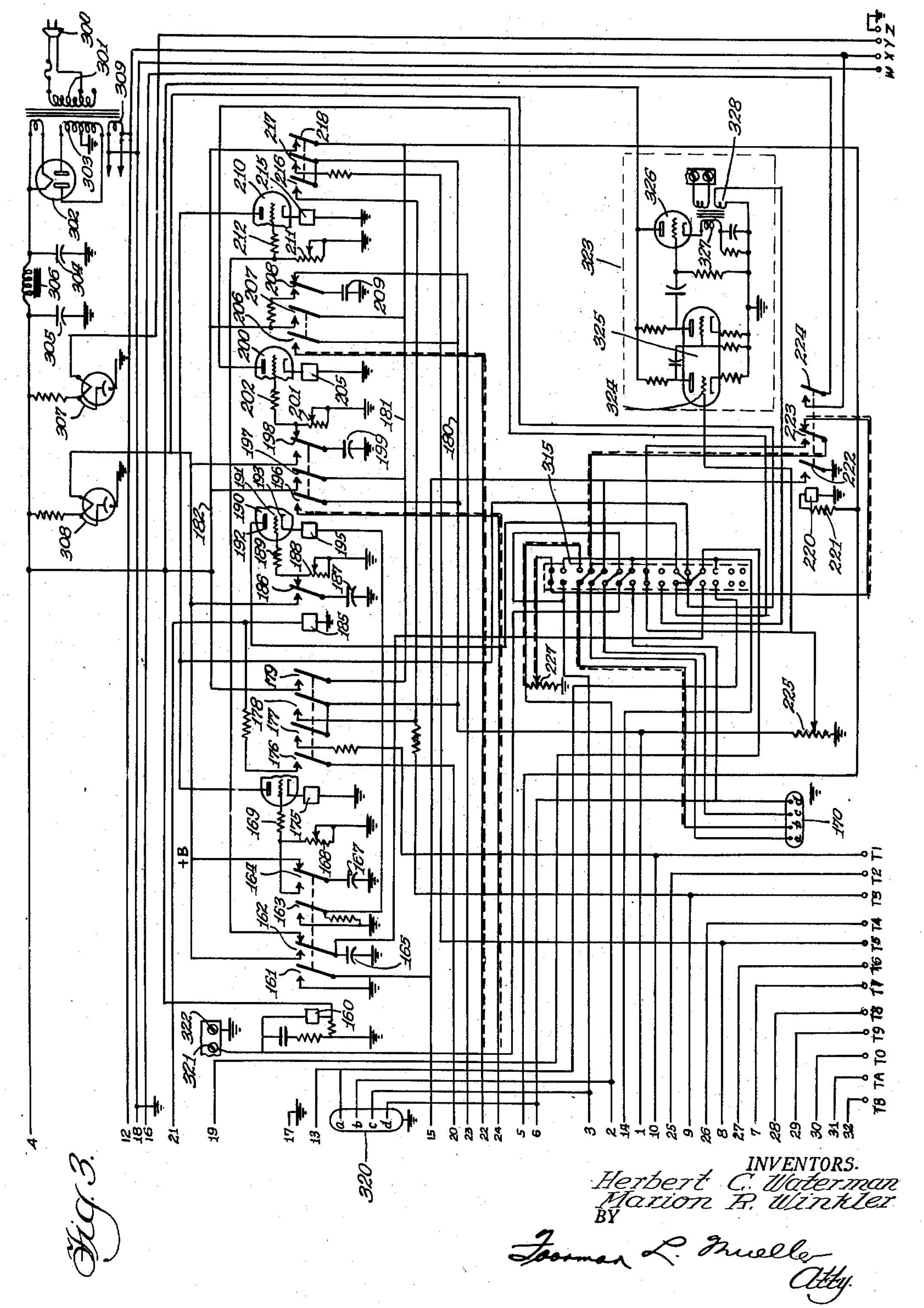
Fig. 3 is a detailed circuit diagram of the timer and power supply chassis of the system.

In Fig. 3 there is shown a more detailed circuit diagram of the timing circuit and power supply. The power supply system may be of any suitable type, the power supply illustrated being adapted to operate from 110 volts alternating current which is applied through plug 300 to a primary winding 301. A full wave rectifier 302 is connected to the secondary winding 303. A filter including condensers 304 and 305 and choke 306 is provided for smoothing the direct current output. A pair of voltage regulator tubes 307 and 308 are provided for furnishing the required voltages. A filament winding 309 provides current for heating the cathodes of the tubes. For applying power from the power supply to the tone generator chassis, the terminals *w*, *x* and *y* are provided, with the terminals *w* and *x* providing heater current and the terminal *y* providing plus B voltage from regulator tube 307.

The timer chassis of Fig. 3 provides complete interconnection required between the tone generator and the control box, as illustrated generally in Fig. 1. The specific connections required are shown in Fig. 3 in which the terminals T1 to T9 inclusive, T0, TA and TB are interconnected with terminals 10, 25, 9, 26, 8, 27, 7 and 28 to 32 inclusive, respectively. The terminals 1 to 10 inclusive and 12 to 32 inclusive at the left side of Fig. 3 provide interconnection required between the timer chassis and various control boxes. The terminal board 170 for making connections to the remote equipment is generally similar to that shown in Fig. 2 but is shown as including a fourth terminal *d*, which provides a common connection which may be used to provide additional controls or as a ground connection. An additional terminal board 320 is provided for connecting a handset into the timer chassis if desired.

In Fig. 3 there is illustrated a pair of terminals 321 and 322 to which a foot switch may be connected for use instead of the push-to-talk switch on a handset or microphone, if desired. Fig. 3 also illustrates an amplifier 323, which may be used for increasing the tone signals in the event that the microphone used provides a signal greater than the nominal output of the tone generators. The tone signals derived from the resistor 225 may be applied to the grid 324 of a double triode tube 325 and after two stages of amplification in the two sections of the double triode, the tones are applied to the cathode follower 326. The amplified signals are derived from the cathode follower by transformer winding 327. The secondary winding 328 of the transformer is connected to the main terminal board 315 of the time chassis. Interconnection can be made through terminal board to the contact 223 of relay 220 so that the amplified tone signals are applied to terminal *b* of the output terminal board 170.

The main terminal board 315 permits various interconnections of the timer circuit and connections between the timer circuits and the control boxes. The connections illustrated provide operation as described in connection with Fig. 2 and are proper for operation with the control box illustrated in Figs. 5 to 8. It will be obvious that for use in other systems, various other connections of the main terminal board 315 may be required. In other respects the system of Fig. 3 is identical to that of Fig. 2 and consequently will not be described. The same reference numbers are used to identify the corresponding components in each case to simplify study of the circuit.

Figure 4:
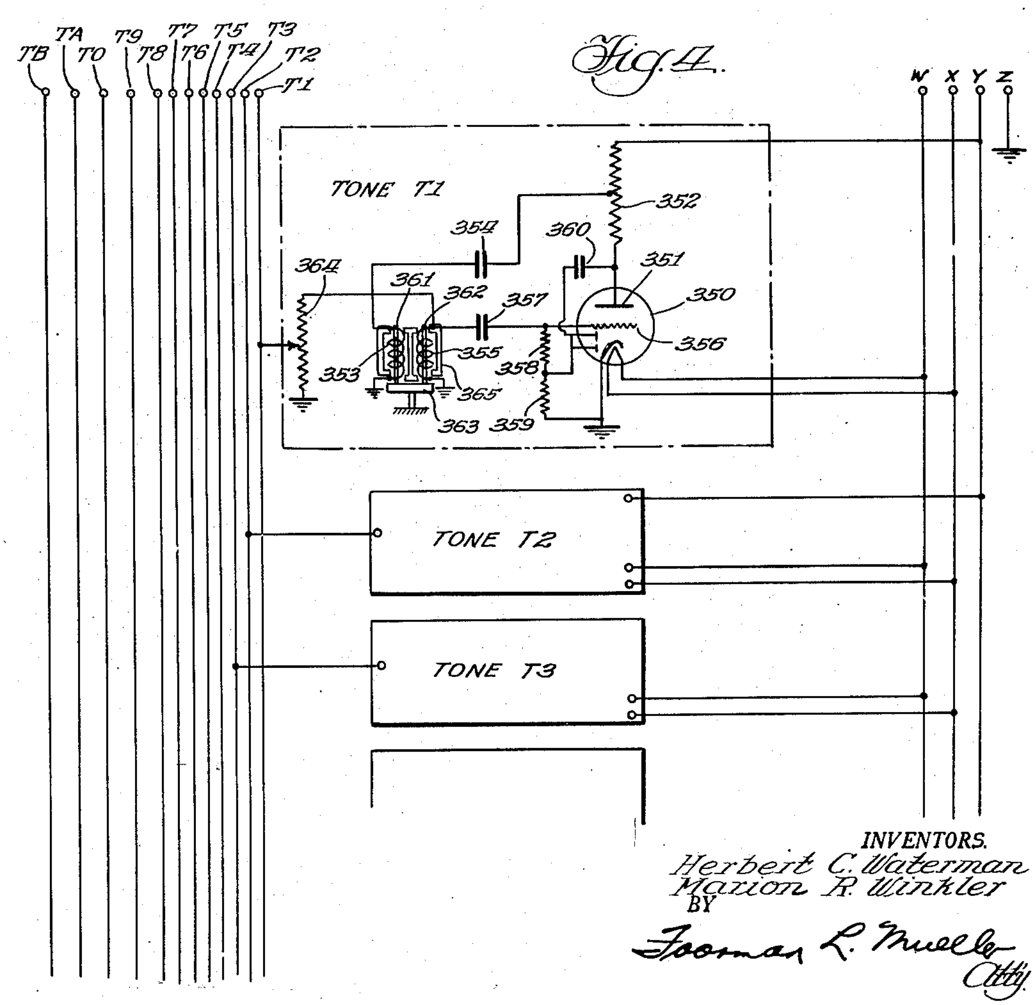
Fig. 4 illustrates the tone generator circuits used in the system.

In Fig. 4 there is illustrated the construction of the tone generator. As shown in Fig. 1, the tone generator is adapted to be interconnected with the chassis including the timing circuits and power supply (Fig. 3) and power connections are made to the tone generator through the terminals *w*, *x* and *y*. The tones produced by the generator are supplied to the timing chassis through terminals T1 to T9 inclusive, T0, TA and TB. The oscillator circuit for tone T1 is illustrated in detail and the oscillator for the other circuits will be of generally similar construction. Vibrating reed structures are used for determining the frequencies of the oscillators of the tone generators in the manner described in the copending application of Marion R. Winkler, Serial No. 343, filed January 2, 1948, now Patent No. 2,547,027, subject: "Vibrating Reed Controlled Oscillator." The circuit disclosed is slightly different than that of the application referred to but operates generally in accordance with the same principles.

The oscillator for tone T1 includes a vacuum tube 350 having a triode section and two diode sections. The plate 351 of the triode is connected through resistor 352 to the plus B potential supplied from terminal *y*. Winding 353 is coupled to the plate 351 through condenser 354 and a tap on the resistor 352. A second winding 355 is coupled to the grid 356 of the tube by condenser 357. Bias for the grid is provided by resistors 358 and 359, the common terminal of which is connected to the anodes of the diodes included in the tube 350. A feed-back condenser 360 is provided between the plate 351 and the anodes of the diodes. Vibrating magnetic reeds 361 and 362 are positioned within the coils 353 and 355 and are mounted on a common support 363. Magnets 365 provide fixed magnetic fields about the reeds. As fully described in the application referred to, the vibrating reeds together with the coils form a sharp filter permitting feed-back at one particular frequency only. The diodes provide amplified automatic volume control so that the amplitude of oscillations is restricted to thereby increase the frequency stability. To provide tones of different frequencies, the lengths and thicknesses of the vibrating reeds may be varied. The values of the capacitors 354 and 357 must also be changed to provide different ranges of frequency. It is noted that the oscillator for tone T1 is connected through variable resistor 364 to terminal T1 and the oscillators for tones T2 and T3 are connected to terminals T2 and T3 respectively. Similarly, additional oscillators are connected to the other terminals to provide the required tones of different frequencies.

Figure 5:
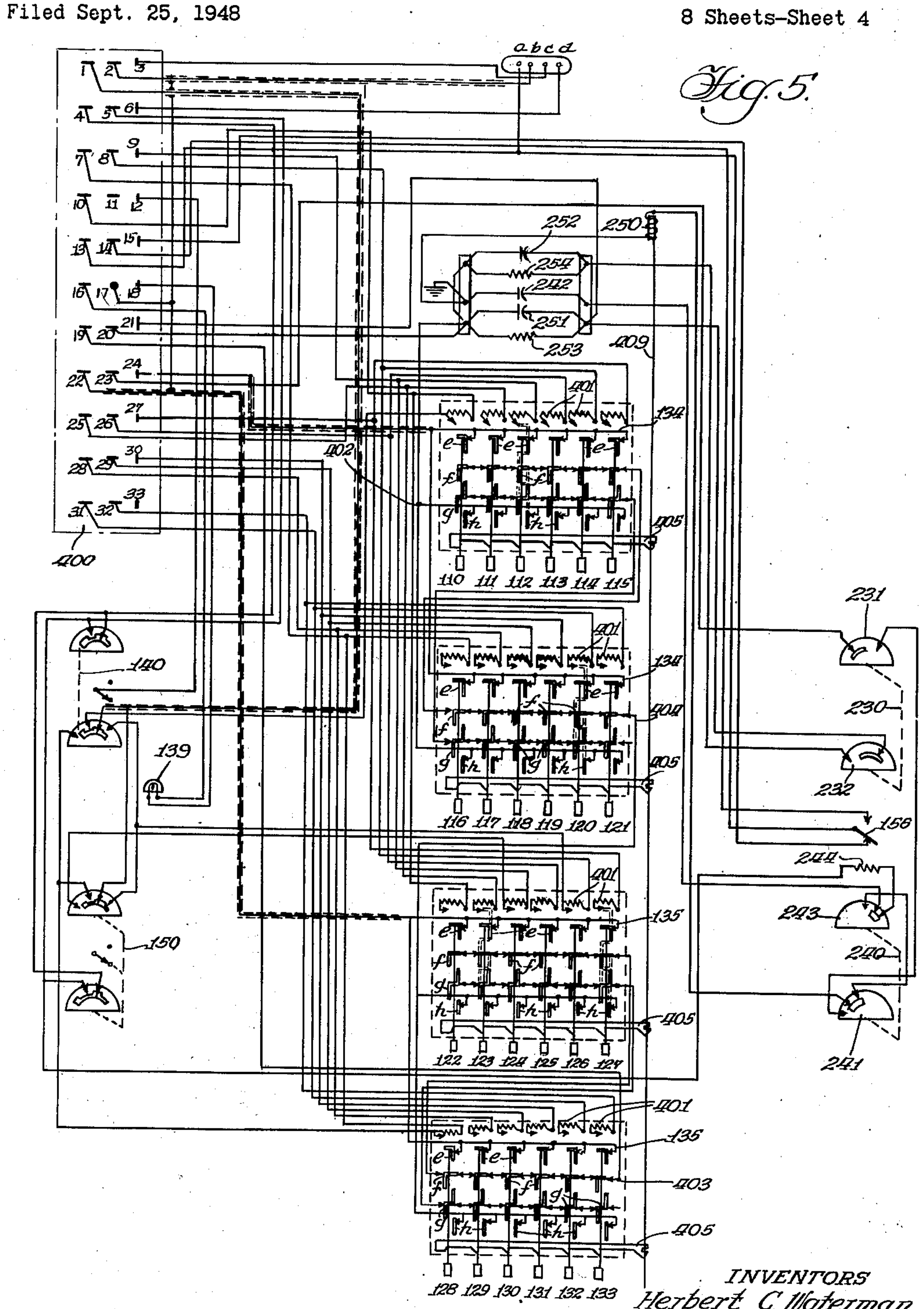
Fig. 5 is a detailed circuit diagram of one control box which may be used.

Figs. 5 to 8 inclusive illustrate more in detail the construction of a control box for use in the selective remote control system. This control box provides a very large number of different selective calling combinations and remote control operations. The operations previously described in connection with Fig. 2 can be produced by this control box as well as other control functions which will be apparent from the following description. Fig. 5 illustrates the circuit of the control box which includes a connecting plug 400 having a plurality of contacts with the contacts 1 to 10 inclusive and 12 to 32 inclusive engaging the similarly numbered contacts of the timing circuit and power supply chassis as illustrated in Fig. 3. The control box includes push-button switches 110 to 133 inclusive for selectively connecting the various audio tones to the timing circuit. As previously described, the push-buttons are in two banks with the first bank including switches 110 to 121 inclusive and the second bank including switches 122 to 133 inclusive. The 12 tones from the tone generator are connected to the 12 switches in each bank with the tones being applied through contacts 7 to 10 inclusive and 25 to 32 inclusive.

As illustrated in Fig. 5, each push-button switch includes a plurality of contacts indicated as *e*, *f*, *g* and *h*. The contacts *e* of the individual switches are arranged to connect the individual tones to the conductors 134 and 135 of the two banks. Resistors 401 are provided for isolating the various tone oscillators from each other, and connections from the tone generator to the conductors 134 and 135, which connect with the timing circuit, are made through the resistors 401. The movable contacts *f*, *g* and *h* of the individual switches and the fixed contacts associated therewith, are for the purpose of providing the connections schematically represented by switches 136 and 137 in Fig. 2. As previously stated, a continuous series circuit is provided when two switches in each bank are operated. This series circuit extends from point 402 to point 403 of Fig. 5. Assuming that switches 112 and 120 of the first bank are actuated as in the previous example, it will be evident that the contact *h* of the switch 112 extends the connection from point 402 to the row of contacts normally associated with the contact members *g*. Operation of the switch 120 will provide a continuous path from the row of contacts normally associated with movable contacts *g* through the particular contact *g* of switch 120 to the row of contacts normally associated with movable contacts *f*. This will provide a continuous circuit to the point 404. The second bank of switches will operate in a similar manner to continue the connection through the contact *h* of switch 123 and the contact *g* of switch 127 to the point 403 which is connected through terminal 19 and which makes connection within the timing chassis to plus B for energizing the relay 185 as previously described.

The switches 140, 150, 230 and 240 operate in exactly the same way as described in Fig. 2. The switches are illustrated in a different manner in Fig. 5 but the function is exactly the same. In Fig. 5, the switch construction shown is the same as that actually used in a model as illustrated in Fig. 6.

Figures 6, 7, 8:
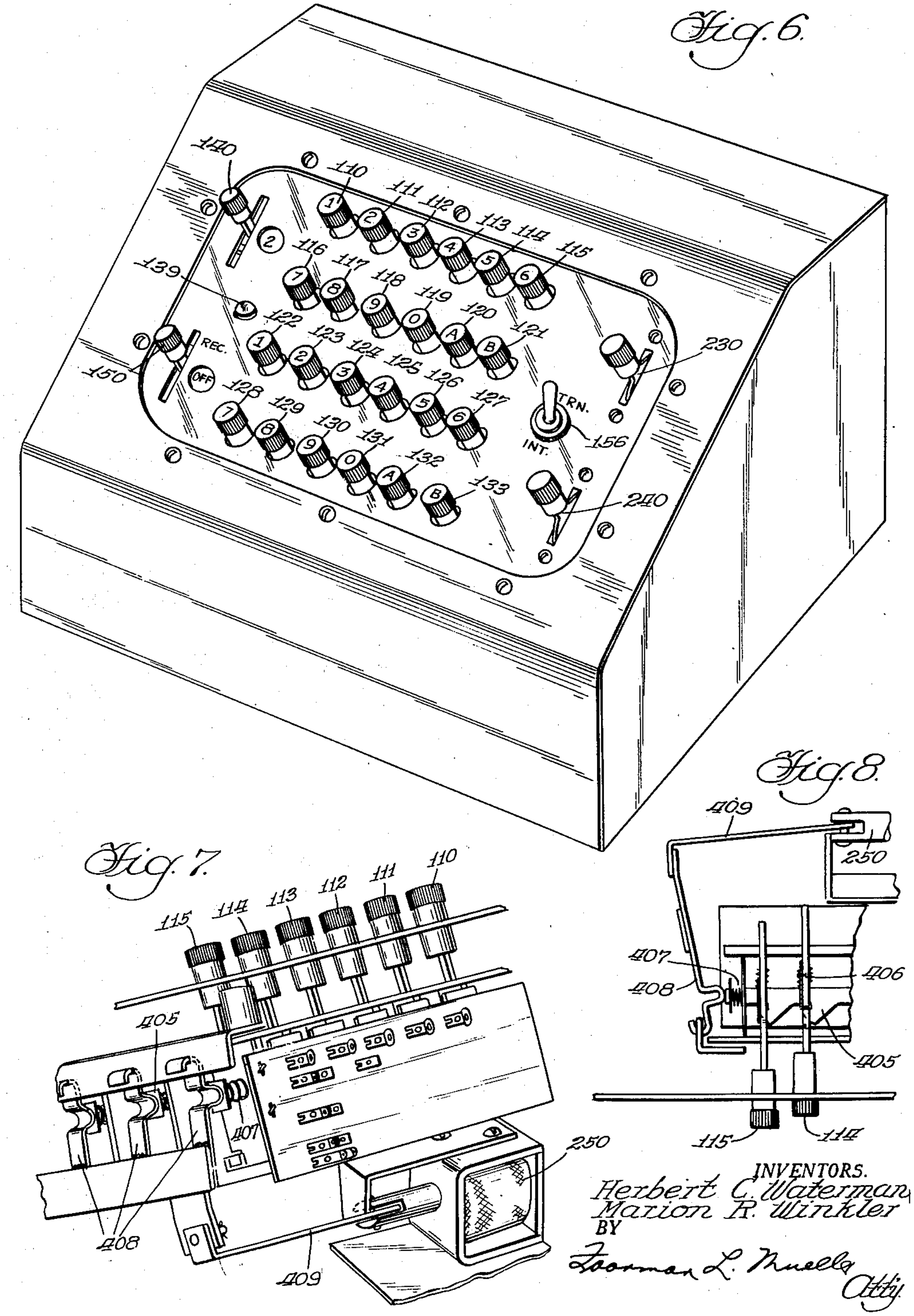
Fig. 6 is a perspective view of the control box of Fig. 5.
Figs. 7 and 8 are detailed views illustrating the mechanism of the control box of Figs. 5 and 6.

Figs. 7 and 8 illustrate the locking and release mechanism of the push-buttons. In Fig. 8 the button 114 is shown depressed and being held in depressed condition by latch bar 405. Springs 406 tend to restore the buttons to normal position and springs 407 urge the latch bars 405 in engaging position. A releasing mechanism including the pivoted levers 408 engage the latch bars 405 to move the same for releasing the push-buttons. A common arm connects with the various levers 408 and is connected to a solenoid 250 through a linkage 409. It is therefore seen that when the solenoid is energized the levers are all pivoted to release the four latch bars of the four rows of contacts and thereby simultaneously release all the push-button switches.

Figure 9:
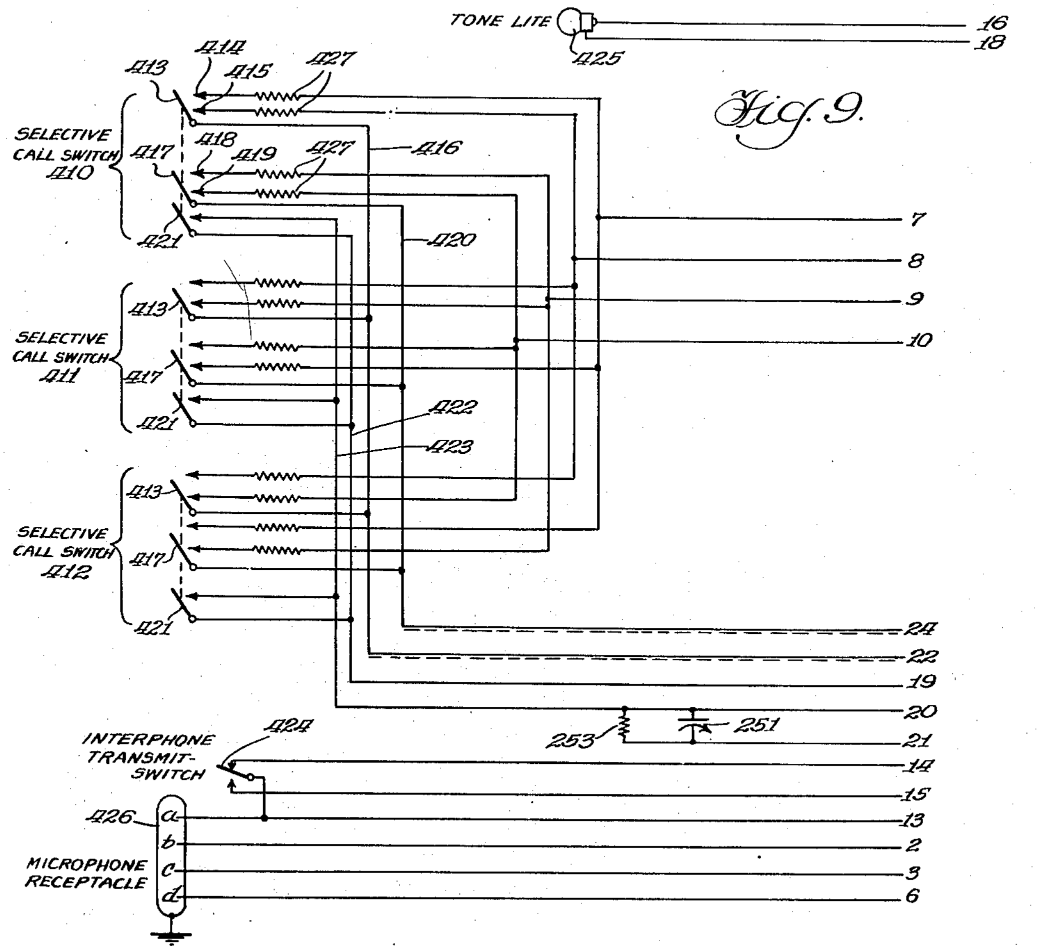
Fig. 9 is a circuit diagram of a simplified control box.
Figure 10:
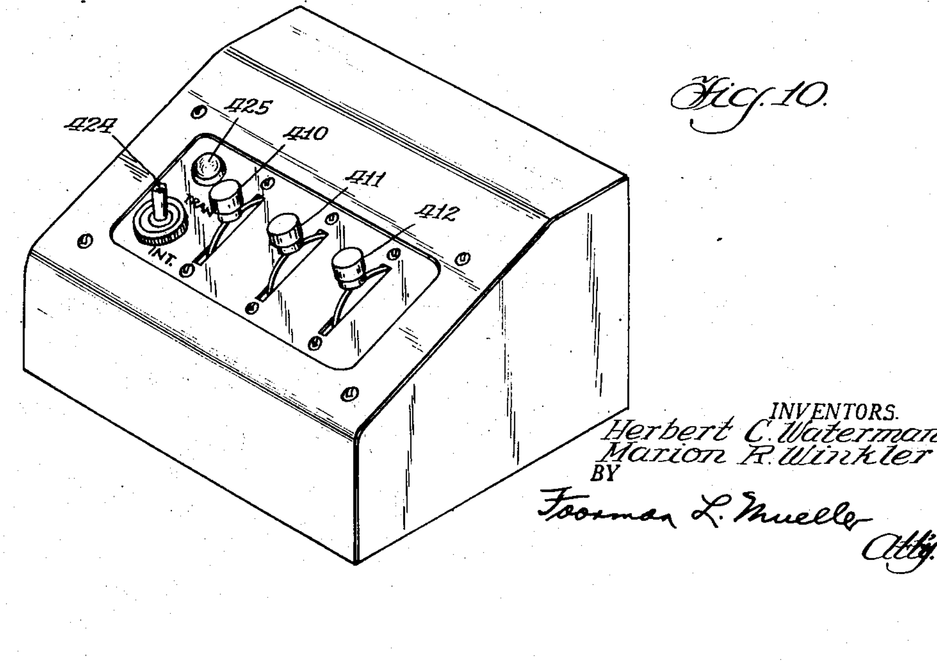
Fig. 10 is a perspective view of the control box of Fig. 9.

Figs. 9 and 10 illustrate a control box for use in a much simpler selective calling system. Fig. 9 is a wiring diagram of the control box and Fig. 10 shows the appearance of the box. This system is adapted to be used with the timing circuit and power supply of Fig. 3 and with a tone generator which provides only four different tones. The connections are made to the timing circuit through terminals 2, 3, 6 to 10 inclusive, 13 to 16 inclusive, 18 to 22 inclusive and 24. These numbers correspond to the numbers shown on Fig. 3 and therefore show the connection of the control box to the timing circuit. The four tones used are applied to the terminals 7, 8, 9 and 10 and from these terminals are connected to the contacts of the calling switches 410, 411 and 412. Each of the calling switches includes a movable contact 413 adapted to interconnect the fixed contacts 414 and 415 to the first tone conductor 416 and a second movable contact 417 adapted to connect the fixed contacts 418 and 419 to the second tone conductor 420. The fixed contacts 414, 415, 418 and 419 are connected through resistors 427 to the terminals to which the tones are applied and the switches are therefore effective to apply the tones in pairs to the tone conductors. The switch 410 includes a third movable contact 421 for interconnecting conductors 422 and 423 which are connected to the terminals 19 and 20. This provides a connection for energizing relay 185 which in turn causes energization of relays 195 and 205 in sequence for applying the tones from conductors 416 and 420 in sequence to the resistor 225 and then in the usual manner to the output terminal board. The condenser 251 and resistor 253 are provided between terminals 20 and 21 and function as in Fig. 2 to cause momentary actuation of relay 185 in the event that the selective switch is operated after the push-to-talk switch has been depressed.

A microphone may be connected to the receptacle 426 which provides connections to the timing circuit and to the output terminal board in the manner previously described. The control box includes a transmit-interphone switch 424 which operates in the manner previously described and a tone light 425 which indicates to the operator when the control operations are completed. It is therefore seen that by operation of a single key the operator can transmit the desired tone combinations for calling any one of three different units. The operator can then communicate directly with the selected unit. It is obvious that more than three keys can be provided in such a unit if it is desired to call any one of a larger number of remote stations. In a larger system a tone generator providing a larger number of different frequencies can be used to provide a large number of different calls.

Figures 11, 12:
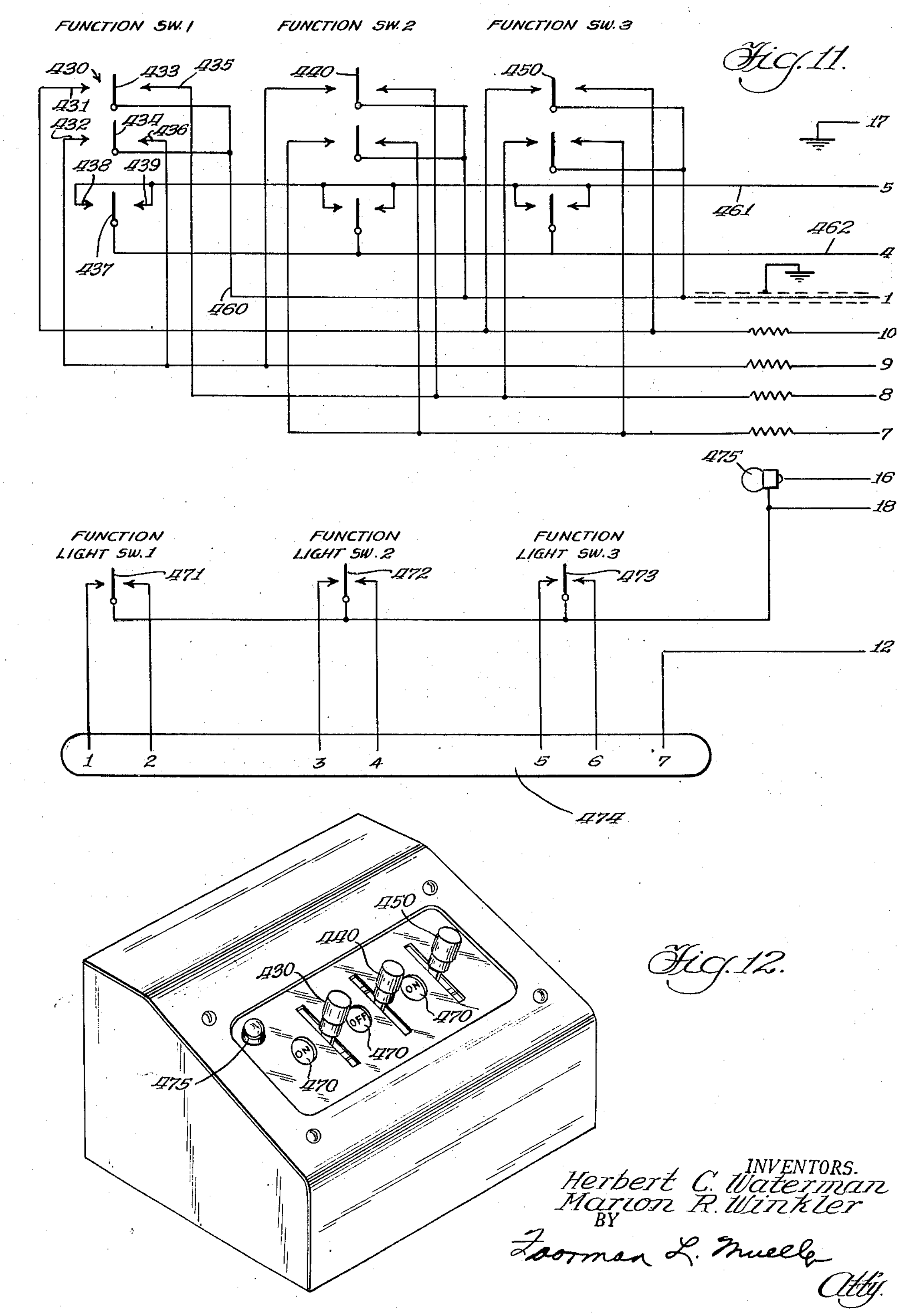
Fig. 11 is a circuit diagram of a modified control box.
Fig. 12 is a perspective view of the control box of Fig. 11.

Figs. 11 and 12 illustrate a control box for use in the system for providing a plurality of remote functions, each of which is controlled by two tones. This control box includes only terminals 1, 4, 5, 7 to 10 inclusive, 12 and 16 to 18 inclusive. These terminals are adapted to interconnect with the corresponding terminals on the timer circuit illustrated in Fig. 3. The control box includes three switches 430, 440 and 450, each including three double throw movable contacts. The switch 430 includes fixed contacts 431 and 432 connected to the tones applied on terminals 10 and 9 respectively. These tones are connected through the movable contacts 433 and 434 to the tone conductor 460 which is connected to terminal 1 and applied to the timing circuit. When the switch is in the other position, the movable contacts 433 and 434 engage fixed contacts 435 and 436 and connect the tones applied to terminals 8 and 9 to the tone conductor 460. Switch 430 includes a movable contact 437 adapted to engage contact 438 or 439 any time the switch is operated to short the conductors 461 and 462 and thereby operate the auxiliary relay 220 so that the tones are applied to the output terminal board. The switches 440 and 450 may be identical to the switch 430 and used to produce additional control functions.

Each of the switches 430, 440 and 450 function in substantially the same manner as switches 140 and 150 of Fig. 2 and may be used in one position to turn on equipment and in the other position to turn the equipment off. A larger number of switches may obviously be provided in a larger control box for producing a larger number of switching functions. In this case more than four separate audio tones may be required.

As illustrated in Fig. 12 indicating means 470 may be provided to indicate the last position in which the switches have been moved so that the operator can tell the condition of the remote equipment. Such means may also be provided for the switches on the other control boxes described as the switches are operated momentarily to send pulses which provide continuous operations. Means for indicating the last position of the switches and therefore the condition of the equipment may be of very great value. For indicating the position of these switches at a remote point auxiliary switches 471, 472 and 473 (Fig. 11) are provided which may be mechanically interconnected with the switches 430, 440 and 450 respectively. The terminal strip 474 may be provided for interconnection for auxiliary switches 472, 473 and 474 with remote indicating means such as a panel of lights. Connections made betwen the terminals 1 to 6 of the terminal strip and terminal 7 through suitable indicating means will energize the means when the switches are operated. The control box of Fig. 12 also includes the tone light 475 which indicates when the switching operations are complete.

Figure 13:
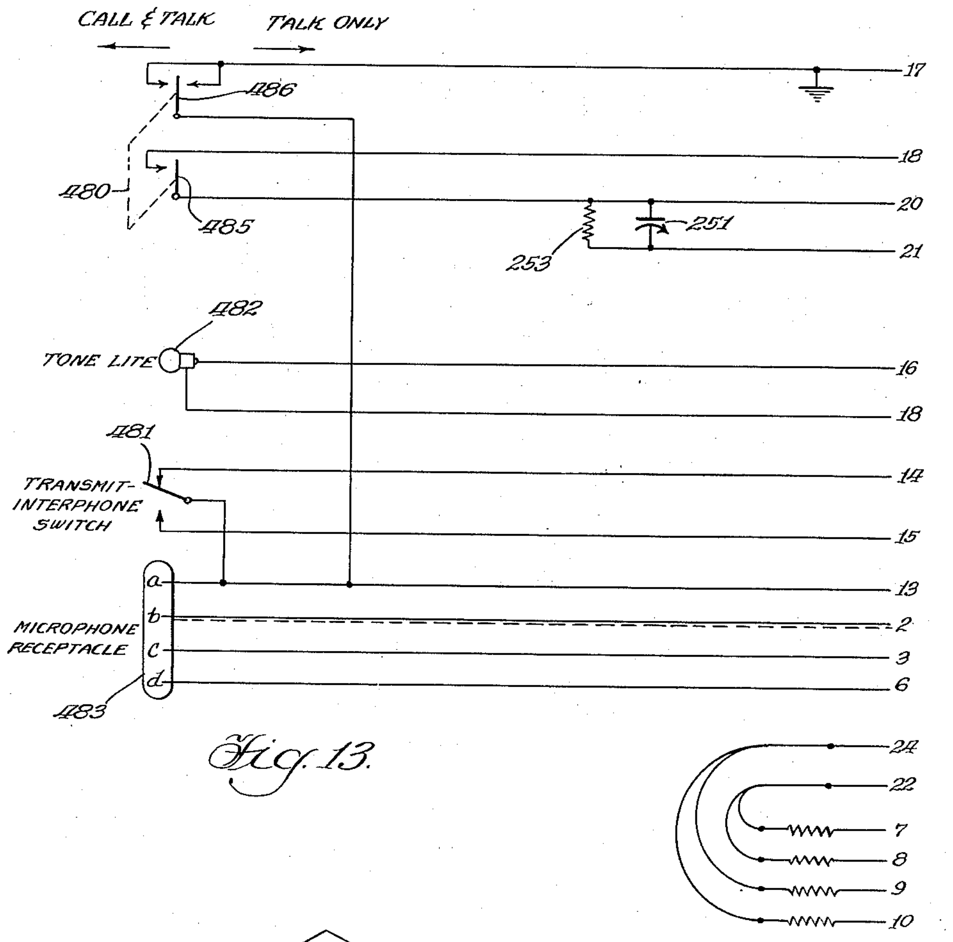
Fig. 13 is a circuit diagram of a still further simplified control box.
Figure 14:
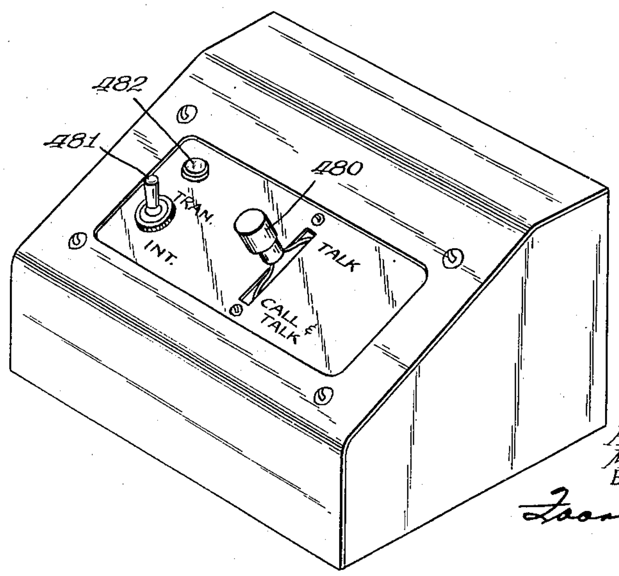
Fig. 14 is a perspective view of the control box of Fig. 13.

In Figs. 13 and 14 there is illustrated a very simple control box in which one remote station can be called. The control box includes a single calling key 480, the usual transmit-interphone switch 481, tone light 482, and a handset receptacle 483. The terminals of the control box are numbered to correspond with the terminals of the timing circuit of Fig. 3 and it will be apparent that when the push-to-talk switch is operated, the timing circuit will operate in the manner previously described. The four tones are provided in the box through terminals 7, 8, 9 and 10 and connection is made to the timing circuit through terminals 22 and 24. When the key 480 is moved to the call-and-talk position, the movable contact 485 functions to ground the terminal *a* of the connector 483. This switch therefore provides the function previously described as preformed by the push-to-talk switch and therefore such a switch need not be used. This switch operates to actuate relay 160 of the timing circuit which in turn operates relay 175 to send the tones for turning on the transmitter. The contact 486 connects conductors 19 and 20 to energize the relay 185 so that the selective calling tones are applied in sequence. Condenser 251 and resistor 253 are provided for momentarily actuating the relay 185 in the event that the control box is used in a system in which it is not desired to use tones for the purpose of turning the transmitter on and off. The connection for turning on the transmitter is made when the key 480 is moved to either the call-and-talk or the talk only position, so that communication can be carried on either when the connection has just been made or at any subsequent time. In the talk only position, no connection is made between terminals 19 and 20 so that the relay 185 does not operate to send out the selective tones. The single key control box may be used when several units operate from the same transmitter as a plurality of different taxi cab companies. The dispatcher for each company will have a single key box for calling the cabs of his company when he desires.

It is seen from the above that there is provided a remote selective calling and selective switching system which is applicable for use in systems which are relatively large and complicated and also for systems which are simple and include only a few stations. The system using the control box illustrated in Fig. 5 can have more than two thousand different calls. The system provides very rapid control and/or selection of one or more remote stations. The system is flexible in operation and the various remote controlling operations provided may or may not be used directly with a communication system. It is obvious that other controls necessary or desirable in a system which might be required by police or fire departments for example, may be provided. Operation of the system is very simple so that a dispatcher may quickly call the desired remote stations and transmit a message thereto and a special switching or control operator is not required.

Although several specific embodiments of the illustration have been illustrated, it is obvious that various changes and modifications can be made without departing from the intended scope of the invention. For example, control boxes including various features of the control boxes illustrated in a great number of different combinations can be provided. It is therefore desired that the invention be limited only to the extent defined in the impending claims.

We claim:

1. In a selective calling system for operating remote equipment in response to predetermined tones, a source of a plurality of tone signals, timing means, and push-button controlled switching means for selecting a plurality of pairs of said tone signals, and for applying the same to said timing means, said timing means selectively transmitting said pairs of tones over a single channel.

2. In a selective calling system for operating remote equipment in response to predetermined tones, a source of a plurality of tones, a control box including locking push-button switches adapted to be operated in any sequence to select a plurality of pairs of said tones, and timing means for transmitting said pairs of tones in a particular sequence, said control box including means for releasing the push-buttons which have been operated when the selected tones have been transmitted.

3. In a selective calling system for operating remote equipment in response to predetermined tones, the combination comprising a plurality of continuously operating tone generators for producing tones of different frequencies, a control box including push-button controlled switching means for selecting a plurality of pairs of tones, and timing means connected to said control box for transmitting said pairs of tones in sequence, said control box including means for causing operation of said timing means to repeat the transmission of said tones.

4. In a selective calling system for operating remote equipment in response to predetermined tones, the combination comprising a plurality of continuously operating tone generators for producing tones of different frequencies, switching means for selecting said predetermined tones, and timing means for transmitting said predetermined tones in a particular sequence.

5. In a selective calling system for operating remote equipment in response to predetermined tones, means for continuously producing a plurality of tones, switching means for selecting said predetermined tones in any order, and timing means for transmitting said predetermined tones as a plurality of pairs applied in sequence.

6. A remote control system for use over an audio channel which carries communication signals, comprising a source of a plurality of tone signals of different audio frequencies, and control means for selecting certain ones of said tone signals and applying the same to said audio channel, said control means including circuit means for automatically disconnecting said communication signals from said audio channel while said tone signals are being transmitted thereby.

7. A remote control system for use with communication equipment and adapted to provide control signals over the audio channel which carries the normal communication signals, comprising means for continuously producing a plurality of tone signals of different audio frequencies and a control box including switches for selecting certain ones of said tone signals and applying the same to said audio channel, said control box including circuit means controlled by said switches for disconnecting said communicating signals from said audio channel while said tone signals are being transmitted thereacross.

8. Control equipment for providing remote selective control of communication equipment and communication therewith over a single audio channel comprising a source of a plurality of tone signals of different audio frequencies, a microphone having a push-to-talk switch included therewith, a circuit connected to said source of tone signals and said microphone including means for automatically applying at least one of said tone signals to said channel in response to operation of said switch, a control box including push-button switches operable for selecting additional tone signals, said control box including means for applying said additional tone signals to said channel after said first tone signal and means for thereafter connecting said microphone to said channel, and release means for automatically restoring said push-button switches after said additional tone signals have been applied to said audio channels.

9. Control equipment for providing remote selective control of communication equipment and communication therewith over a single audio channel, comprising a source of a plurality of tone signals of different audio frequencies a microphone having control means included therewith, a circuit connected to said source of tone signals and said microphone including means for automatically applying a first pair of said tone signals to said channel in response to operation of said control means, means for selecting additional pairs of tone signals, said control circuit including means for applying said additional pairs of tone signals to said channel in sequence after said first pair of tone signals and means for thereafter connecting said microphone to said channel, said control circuit including means for applying a further pair of tone signals to said equipment when said control means is released.

10. Control equipment for providing remote selective control of communication equipment and communication therewith over a single audio channel, comprising a source of a plurality of tone signals of different audio frequencies, a microphone, a switch, a circuit connected to said source of tone signals, said microphone and said switch, and including first contact means automatically operated for applying a first pair of said tone signals to said channel in response to operation of said switch, means for selecting additional pairs of tone signals, said control circuit including second contact means for applying said additional pairs of tone signals to said channel in sequence after said first pair of tone signals, third contact means for thereafter connecting said microphone to said channel, and fourth contact means for applying a further pair of tone signals to said equipment when said switch is released.

11. Control equipment for providing remote selective control of communication equipment and communication therewith over a single audio channel, comprising a source of a plurality of tone signals of different audio frequencies, a microphone having a push-to-talk switch included therewith, a circuit connected to said source of tone signals and said microphone including means for automatically applying a first pair of said tone signals to said channel in response to operation of said switch, means for selecting additional pairs of tone signals, said control circuit including means for applying said additional pairs of tone signals to said channel in sequence after said first pair of tone signals and for thereafter connecting said microphone to said channel, said control circuit including additional means for applying a further pair of tone signals to said equipment when said switch is released.

12. Control equipment for providing remote selective control of communication equipment and voice communication therewith over a single audio channel comprising tone generator means for continuously producing a plurality of tones of different audio frequencies, a microphone having a push-to-talk switch included therewith, a circuit connected to said tone generator means and said microphone including means for automatically applying at least one of said tones to said channel in response to operation of said switch, means for selecting additional tones, said control circuit including means for applying said additional tones to said channel after said first tone and for thereafter connecting said microphone to said channel, and means for indicating when said microphone is connected to said audio channel.

13. Control equipment for providing remote selective control of communication equipment and voice communication therewith over a single audio channel comprising tone generator means for continuously producing a plurality of tones of different audio frequencies, a microphone having a push-to-talk switch included therewith, a circuit connected to said tone generator means and said microphone including means for automatically applying at least one of said tones to said channel in response to operation of said switch, means for selecting additional tones, said control circuit including means for applying said additional tones to said channel after said first tone and for thereafter connecting said microphone to said audio channel.

14. A system for controlling a transmitter at a remote station and for applying selectively calling and communication signals to said transmitter for transmission thereby, comprising a source of a plurality of different tone signals, a timing circuit connected to said source of tone signals, a control box to which said tone signals are applied, a microphone having control means connected to said control box, said control box including means for applying to said timing circuit, signals from said microphone and said control means and selected pairs of said tone signals, said timing circuit including means operated by said signal from said control means and having first contacts which operate to apply a first pair of said tone signals to said transmitter for turning said transmitter on, second contacts automatically operating a predetermined time after said first contacts operate for applying said selected pairs of tone signals to said transmitter, third contacts automatically operating a predetermined time after said second operate for connecting said microphone to said transmitter so that a message can be transmitted thereby, and fourth contacts operating in response to release of said control means for applying an additional pair of tone signals to said transmitter for turning said transmitter off.

15. A system for controlling from a central station a communication network including a transmitter at a first remote station and a plurality of receivers at other remote stations which are rendered operative in response to tones of particular frequencies, and in which system a single audio channel is used for control and communication, comprising tone generating means for continuously producing a plurality of different tones of audio frequency, a timing circuit connected to said tone generator means, a control box to which said tones are applied, a microphone having control means connected to said control box, said control box including means for applying signals from said microphone and said control means and selected pairs of said tones to said timing circuit, said timing circuit including contact means actuated in response to a signal from said control means for applying to said transmitter in sequence; a first pair of tones for turning said transmitter on, said pairs of selected tones for transmission to said receivers for selectively rendering said receivers operative, and said signals from said microphone for transmission to said selected receiver, said timing circuit including further contact means for applying to said transmitter an additional pair of tones to turn said transmitter off in response to release of said control means.

16. A system for controlling from a central station a communication network including a transmitter at a first remote station and a plurality of receivers at other remote stations which are rendered operative in response to tones of particular frequencies, and in which system a single audio channel is used for control and communication, comprising tone generator means for continuously producing a plurality of different tones of audio frequency, a timing circuit connected to said tone generate means, a control box to which said tones are applied including means for selecting said tones, a microphone having a push-to-talk switch connected to said control box, said control box including means for applying signals from said microphone and said selected tones to said timing circuit, said timing circuit including contact means actuated in response to operation of said push-to-talk switch for connecting to said transmitter in sequence; at least one tone of predetermined frequency for turning said transmitter on, said selected tones for transmission to said receivers for selectively rendering said receivers operative, and said signals from said microphone for transmission to said selected receiver, said timing circuit including further contact means for applying to said transmitter at least one additional tone to turn said transmitter off when said push-to-talk switch is released.

17. A system for controlling from a central station a communication network including a transmitter at a first remote station, and a plurality of receivers at other remote stations which are rendered operative in response to tones of particular frequencies, and in which system a single audio channel is used for control and communication, comprising a source of a plurality of different tones of audio frequency, a timing circuit connected to said source of tones, a control box to which said tones are applied, a microphone having control means connected to said control box, said control box including means for connecting said microphone and selected pairs of said tones to said timing circuit, said timing circuit including contact means operating in sequence in response to a signal from said control means for applying to said transmitter in sequence, a first pair of tones for turning said transmitter on and said pairs of selected tones for transmission to said receivers for selectively rendering said receivers operative and for thereafter connecting said microphone to said transmitter, said control box including means for indicating when said microphone is connected to said transmitter, said timing circuit including additional contact means for applying an additional pair of tones to said transmitter to turn said transmitter off when said control means is released.

18. A system for controlling a communication network including a plurality of remote stations from a central station, and in which a single audio channel provides both control and communication, comprising tone generator means for continuously producing a plurality of different tones of audio frequency, a timing circuit connected to said source of tones, a control box to which said tones are applied including means for selecting pairs of tones, a microphone having control means connected to said control box, said control box being interconnected with said timing circuit for connecting said microphone and said control means thereto and for applying said selected pairs of tones thereto, said timing circuit including contact means automatically operating in timed sequence in response to operation of said control means for applying to said audio channel in sequence a first pair of tones and said selected pairs of tones for providing control functions, and for connecting said microphone to said audio channel for communication thereover, said timing circuit including additional contact means for applying an additional pair of tones to said communication channel when said control means is released.

19. A system for controlling a communication network including a plurality of remote stations from a central station, and in which a single audio channel provides both control and communication, comprising tone generator means for continuously producing a plurality of different tones of audio frequency, a timing circuit connected to said source of tones, a control box to which said tones are applied including means for selecting pairs of tones, a microphone having control means connected to said control box, means interconnecting said control box and said timing circuit for applying signals from said microphone and said control means, and said selected pairs of tones to said timing means, said timing circuit including contact means automatically operating in timed sequence in response to operation of said control means for applying to said audio channel in sequence a first pair of tones and said selected pairs of tones for providing control functions, and for connecting said microphone to said audio channel for communication thereover, said timing circuit including contact means actuated when said control means is released for applying an additional pair of tones to said communication channel, said control box and said timing circuit including provisions for applying other pairs of said tones to said audio channel independently of operation of said control means.

20. A system for controlling a communication network including a plurality of remote stations from a central station, and in which a single audio channel provides both control and communication, comprising tone generator means for continuously producing a plurality of different tones of audio frequency, a timing circuit connected to said source of tones, a control box to which said tones are applied for selecting pairs of tones, a microphone and a switch connected to said control box, means interconnecting said control box and said timing circuit for connecting said microphone, said switch, and selected pairs of said tones to said timing means, said timing circuit including contact means operating automatically in response to operation of said switch for applying to said audio channel in sequence a first pair of tones and said selected pairs of tones for providing control functions and for connecting said microphone to said audio channel for communication thereover, said control box including indicating means for indicating when said microphone is connected to said audio channel, said timing circuit including additional contact means for applying an additional pair of tones to said communication channel when said switch is released.

21. A system for controlling a communication network including a plurality of remote stations from a central station, and in which a single audio channel provides both control and communication, comprising tone generator means for continuously producing a plurality of different tones of audio frequency, a timing circuit connected to said source of tones, a control box to which said tones are applied for selecting certain of said tones, a microphone having a push-to-talk switch connected to said control box, means interconnecting said control box and said timing circuit for connecting said microphone, said push-to-talk switch, and said selected tones thereto, said timing circuit including contact means operating in response to operation of said push-to-talk switch for connecting to said audio channel in sequence, at least one tone for providing a first control function, said selected tones for providing a second control function, and said microphone for communication over said audio channel, said timing circuit including additional contact means for connecting at least one additional tone to said communication channel when said control means is released for providing an additional control function.

22. In a selective calling system for operating remote equipment in response to predetermined combinations of signals, a source of a plurality of electrical signals of different frequencies, timing means, and push-button controlled switching means for selectively applying a plurality of combinations of said signals to said timing means, said timing means transmitting said combinations of signals in sequence.

23. In a selective calling system for operating remote equipment in response to calling signals each including a plurality of tone signals, tone generator means for continuously producing a large number of different tone signals of audio frequency, a control box including means for combining predetermined ones of said tone signals for producing different calling signals, and timing means for transmitting said calling signals in a predetermined manner.

24. A selective calling system for operating remote equipment in response to predetermined signals comprising, tone generator means for continuously producing a plurality of tone signals, push button controlled switching means for selecting a predetermined number of said tone signals, and timing means automatically operated in response to the selection of said predetermined number of tone signals for transmitting said tone signals selected in a particular sequence.

HERBERT C. WATERMAN.
MARION R. WINKLER.

REFERENCES CITED

The following references are of record in the file of this patent:

UNITED STATES PATENTS

| Number | Name | Date |
|---|---|---|
| 1,726,947 | Chauveau | Sept. 3, 1929 |
| 1,765,471 | Wensley | June 24, 1930 |
| 2,147,710 | Mallina | Feb. 21, 1939 |
| 2,232,398 | Lundstrom | Feb. 18, 1941 |